Aug. 25, 1942.    R. M. DOUGLAS ET AL    2,294,331
SERVO-MOTOR
Filed July 26, 1940

INVENTOR
RAYMOND M. DOUGLAS
RALPH S. HUYCK
BY H. O. Clayton
ATTORNEY

Patented Aug. 25, 1942

2,294,331

UNITED STATES PATENT OFFICE 2,294,331

SERVOMOTOR

Raymond M. Douglas and Ralph S. Huyck, South Bend, Ind., assignors to Bendix Aviation Corporation, South Bend, Ind., a corporation of Delaware Application July 26, 1940, Serial No. 347,588

1 Claim. (Cl. 121—41)

This invention relates in general to motors, and more particularly to the piston or so-called power element of a pressure differential operated motor. When such a motor is energized the piston thereof is subjected to a differential of pressures resulting in a movement of the piston to actuate the mechanism to which the piston is connected. It is of course desirable that the piston be of light weight and of relatively few parts. It is, however, particularly desirable that there be no leakage of power fluid from one compartment of a double-ended motor to the other compartment or into or from the compartment of a single acting motor. In other words, there should be a fluid-tight seal between the inner wall of the cylinder of the motor and the periphery of the piston. Accordingly, the principal object of our invention is to provide a simple, durable and inexpensive piston construction effective to prevent the passage of air or other power fluid between the periphery of the piston and the cylinder wall and of such construction as to require a minimum of service for a long period of time.

A further object of the invention is to provide a one-piece piston of but two materials, a synthetic compound and a metal, the metal constituting the disk or body portion of the piston and the synthetic material, which is bonded to the body portion, constituting the peripheral element of the piston.

Another object of our invention is to provide, in a motor having means to resist relative movement of the parts of a follow-up valve within the motor, a piston requiring but a minimum of force to move the same within the casing of the motor, said piston being connected to one of the parts of the valve.

Figure 1:
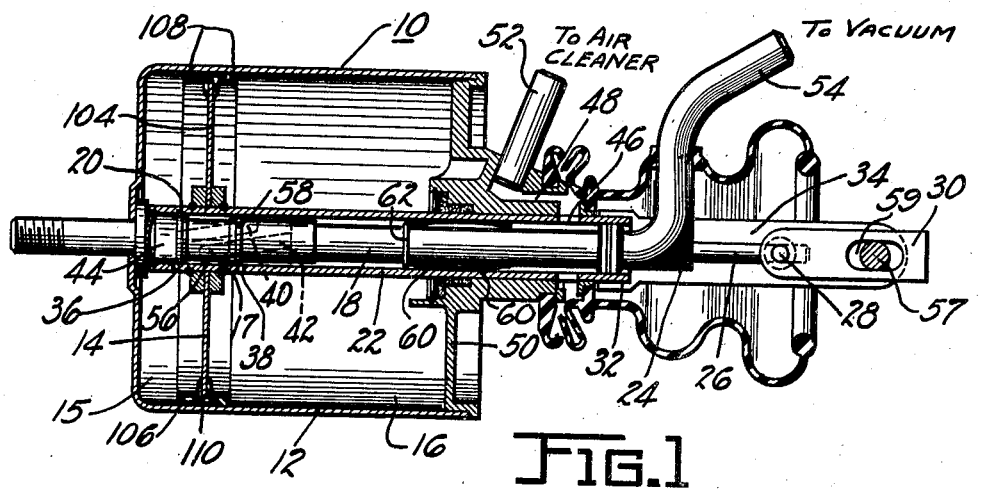
Figure 2:
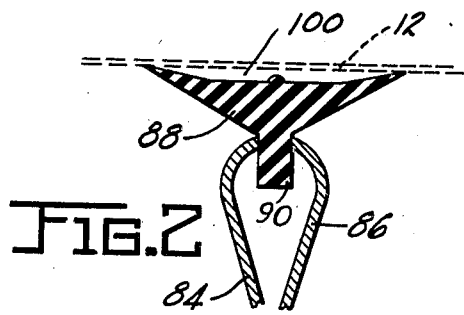
Figure 3:
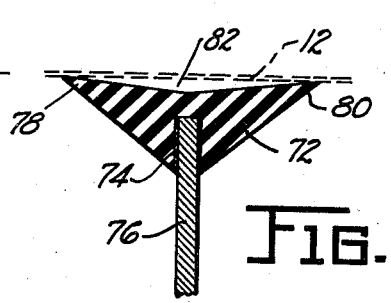
Figure 4:
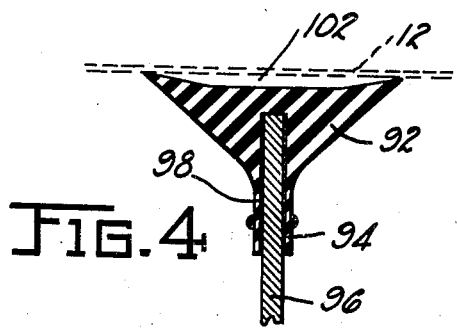
Figure 5:
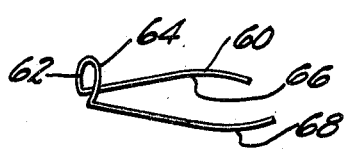

Other objects of the invention and desirable details of construction of parts will become apparent from the following detailed description of certain embodiments of the invention, taken in conjunction with the accompanying drawing illustrating said embodiments, in which:

Fig. 1 is a longitudinal sectional view of the servo-motor. Figs. 2, 3 and 4 are sectional views of a detail of the piston structure, Figs. 3 and 4 being modifications of Fig. 2. Fig. 5 is a perspective view of one of the elements of the servomotor.

Referring now to the preferred embodiment of our invention disclosed in Figures 1 and 3, a double-acting, double-ended motor 10 includes a casing 12, which houses a reciprocable piston 14. The casing and piston together provide compartments 15 and 16 and it is the gaseous pressure within said compartments that effects the operation of the motor. The operation of the motor, that is the influx and efflux of air or other power fluid into or from the compartments 15 and 16 is controlled by a so-called follow-up valve mechanism comprising a spool-shaped member 17 mounted on the end of a hollow valve operating rod 18 and the end portion 20 of a hollow connecting rod 22. The rod 18 is preferably welded at 24 to a link 26 adjustably connected at 28 to a manually operated link 30 and the rod 22 is connected at 32 to a link 34 connected to the mechanism to be actuated. The valve member 20 is provided with ports 36 and 38 and the valve member 17 is provided with diagonally extending ducts 40 and 42. No claim is made to the valve mechanism disclosed inasmuch as said mechanism is described and claimed in United States Patent Number 2,212,955.

When the valve members are in the position disclosed in Figure 1 the motor is said to be de-energized, for at that time both compartments 15 and 16 are vented to the atmosphere. Compartment 15 is vented via port 36, a compartment 44 in the end of the rod 22, duct 40 in the valve member 17, the hollow connecting rod 22, a port 46 in the rod 22, a duct 48 in a cylindrical end plate 50 and a nipple 52. To the nipple 52 there is connected an air cleaner not shown. The compartment 16 is vented to the atmosphere via port 38, the hollow connecting rod 22, port 46, duct 48, nipple 52 and the air cleaner.

In order to energize the motor, that is effect a movement of its piston, the spool-shaped valve member 17 is moved either to the right or left, Figure 1, said movement being effected by the manual operation of the link 30. If the movement is to the right, one end of the member 17 moves across the port 38 thereby placing the duct 42 in fluid transmitting connection with the compartment 16, the duct 42 opens into the hollow rod 18 to which is connected a conduit 54 leading to a source of vacuum such as the intake manifold of an internal combustion engine; accordingly, when the valve member 17 is moved to the right the compartment 16 is partially evacuated, the air from said compartment flowing through the port 38, a recess 56 in the valve member 17, duct 42, hollow rod 18 and the conduit 54.

The piston 14 is then moved to the right, for it will be remembered that the compartment 15 is at the time vented to the atmosphere. The piston is therefore subjected to a differential of pressures effecting this movement. If movement of the manually operated valve member 17 is stopped before the piston has completed its stroke, the piston will continue moving until the gaseous pressures within the compartments 15 and 16 are such as to place the system in equilibrium. Describing this operation, valve member 20 may follow up, that is move to a so-called lapped position, that is when a full-bodied end portion 58 of the valve member 17 is positioned over the port 38 to prevent a flow of air through said port; or the resistance to movement of the piston may be such as to result in a follow-up movement of the valve member 20 to again vent the compartment 16 to the atmosphere. The valve members 17 and 20 would then again be in the position disclosed in Figure 1.

Having described the operation of the motor to effect a movement of the piston 14 to the right it is not believed necessary to describe in detail the reverse operation of the motor to effect a movement of the piston to the left, for functionally these operations are identical, as will be apparent from an inspection of Figure 1, the latter operation being effected by moving the manually operated valve member 17 to the left to connect the compartment 15 with the source of vacuum.

There is thus provided a simple and compact double-acting motor controlled by a follow-up valve. The means or so-called work actuated by the piston follows the movement of the manually operated link 30, said link being connected i. e. to a brake pedal, a clutch pedal or a selector mounted beneath the steering wheel for controlling the transmission; for after the valve is opened by moving the link 30, the piston and the mechanism connected thereto is moved and should the movement of the selector or brake pedal or clutch pedal be stopped before its movement is completed then the movement of the mechanism being operative is also stopped. Should the motor, that is the power means, fail for any reason, then the mechanism to be operated will be actuated solely by physical effort; for in such an event a pin 57 secured to the link 34 will contact one end or the other of a slot 59 in the link 30.

Describing now an important feature of our invention, it is desirable to prevent relative movement of the valve members 17 and 20 which movement may be caused by jarring the motor 10 and the force transmitting mechanism connected to the valve members. It is assumed, for example, that the motor is employed to operate or aid in the operation of the transmission of an automotive vehicle. Now when the vehicle is travelling over rough ground the inertia of the linkage connected to the valve members may result in a relative movement of said members to effect an undesired opening of the valve. The motor is of course then energized resulting in an undesired movement of a shift rail of the transmission. In order to prevent this operation of the valve there is housed within the motor a bent wire member 60, one end 62 of which partially encircles the rod 18. It is bent upwardly at 64 and curved outwardly at 66 and 68. The member 60 is frictionally held in position on the rod 18, the circular shaped end 62 fitting tightly about said rod.

The curved sides 66 and 68 of the member 60 are slightly distorted when the rod 18 and head member 17 are slid within the hollow rod 22; accordingly, the sides 66 and 68 which are under tension, provide a means setting up a frictional resistance to relative movement of the rods 17 and 22. This resistance is of course overcome by the driver of the car when, in opening the valve, he moves the transmission controlling selector lever mounted adjacent the steering wheel; and this resistance is also overcome when the piston is moving to effect the above described follow-up action of the valve. Accordingly, the spring 60 serves to prevent relative movement of the valve members when the driver's hand is removed from the selector lever.

Passing now to another important feature of our invention there is provided in the piston 14 a simple and inexpensive element of the motor which in large measure contributes to the efficiency and effectiveness thereof. Describing in detail the construction of the preferred embodiment of the piston which is disclosed in Figure 3, a peripheral ring member 72, preferably of synthetic rubber-like material, is bonded to a brass plate peripheral section 74 of a metal disk 76. The synthetic material which may be any one of buna rubber, neoprene, corprene, or perbuna, is molded to the periphery of the disk 76, the copper crystals of the brass plating having an affinity for the synthetic material. The rubber or rubber-like synthetic material of which the member 72 is made is characterized by having a relatively high permanent set, thereby preventing a sticking of the material to the cylinder walls. This material is also so constituted as to be easily slid over the surface of the cylinder walls. However, the spring 60 prevents an untimely opening of the valve despite a low frictional resistance to movement of the piston 14.

Describing further the peripheral member or seal 72 disclosed in Figure 3 the same is substantially triangular-shaped in cross section, the apexes of said member constituting flexible lips 78 and 80 which provide an effective seal against the passage of air or other power fluid between the seal and the inner surface of the motor casing 12. It will be noted that the top of the member 72 is slightly V-shaped or concaved providing a pocket 82. With such a structure, when the compartment 16 is evacuated, air will, by virtue of the shape of the lip 80, flow out of the pocket 82 into said compartment. By virtue of the shape of the lip 78 said lip will be forced against the inner wall of the motor casing 12 shown by dotted lines in Figure 3; for the compartment 16 is at atmospheric pressure and the pocket 82 will be partially evacuated, thereby creating a differential of pressures to effect this result. And it follows that should the compartment 15 be evacuated, the lip 80 would, by virtue of the differential of pressures in the pocket 82 and said compartment, be forced against the inner wall of the motor casing. There is thus provided a one-piece motor piston, simple in construction, light in weight and effective as a power element of the motor, the construction of the piston being such as to prevent the flow of air, or other power fluid, from one compartment to the other when the motor is being energized.

There are disclosed, in Figures 1, 2 and 4, other embodiments of piston construction constituting our invention. Describing the invention disclosed in Figure 2, two body plate members 84 and 86 curved outwardly adjacent their peripheries, serve to clamp in position a peripheral ring member 88 of one of the aforementioned synthetic materials. The major portion of this member is substantially triangular in cross section, a rectangular shaped portion 90 of the member extending between the peripheral edges of the body members 84 and 86. The piston of Figure 4 is practically identical with that disclosed in Figure 3, differing only in the shape of a base portion 94 of a seal member 92, said base portion being recessed to receive a disk body member 96 and thereby providing a relatively large area of contact between the seal member and a brass plated portion 98 of the member 96. The seal members 88 and 92 of the embodiments disclosed in Figures 2 and 4 are shaped on their top surface to provide pockets 100 and 102 respectively, which pockets serve the same purpose as the pocket 82 in the seal 72.

Referring to the piston 14 disclosed in Figure 1 the same comprises a metal disk 104 bonded to a ring 106 of any one of the aforementioned synthetic materials. This ring or seal member is substantially rectangular shaped in cross section, the end walls extending on the diagonal to provide lips 108. The outer surface of the seal member is recessed to receive a ring 110, rectangular shaped in cross section, said ring being made of a synthetic material such as buna rubber characterized by its ability to absorb oil. Accordingly, the ring 110 serves to facilitate the reciprocatory movement of the piston within the cylinder 12.

Although this invention has been described in connection with certain specific embodiments, the principles involved are susceptible of numerous other applications that will readily occur to persons skilled in the art. The invention is, therefore, to be limited only as indicated by the scope of the appended claim.

We claim:

A fluid pressure operated motor comprising a piston so constituted as to have a relatively low frictional resistance to movement within the casing of the motor, follow-up valve means for controlling the operation of the motor and housed within the same, said valve means including a power operated valve member secured to the hub of said piston and a manually operated valve member housed within said power operated valve member, a hollow connecting rod secured to the power operated valve member, a hollow rod secured to the manually operated valve member and a bent wire spring member interposed between said rods in disconnected engagement therewith and having a portion thereof partially encircling the second mentioned hollow rod, said spring member being operative to increase the force required to move one of the valve members with respect to the other whereby an undesired operation of the valve means is obviated when the motor is jarred or shaken.

RAYMOND M. DOUGLAS.
RALPH S. HUYCK.